United States Patent
Zumbrunnen

(10) Patent No.: US 7,377,684 B2
(45) Date of Patent: May 27, 2008

(54) MULTI-COMPONENT BLENDING SYSTEM

(75) Inventor: David A. Zumbrunnen, Seneca, SC (US)

(73) Assignee: Clemson University, Clemson, SC (US)

(*) Notice: Subject to any disclaimer, the term of this patent is extended or adjusted under 35 U.S.C. 154(b) by 583 days.

(21) Appl. No.: 11/138,944

(22) Filed: May 26, 2005

(65) Prior Publication Data

US 2005/0265119 A1 Dec. 1, 2005

Related U.S. Application Data

(60) Provisional application No. 60/575,552, filed on May 28, 2004.

(51) Int. Cl.
*B01F 7/00* (2006.01)
*B01F 7/28* (2006.01)
*B01F 3/10* (2006.01)

(52) U.S. Cl. .................. 366/97; 366/297; 366/331
(58) Field of Classification Search ............ 366/97, 366/292, 297, 298, 299, 331, 100
See application file for complete search history.

(56) References Cited

U.S. PATENT DOCUMENTS

| | | | | |
|---|---|---|---|---|
| 2,474,006 A | * | 6/1949 | Maycock | 261/83 |
| 2,563,396 A | | 8/1951 | Columbo | |
| 3,095,349 A | * | 6/1963 | Rich | 162/236 |
| 3,343,212 A | * | 9/1967 | Adams | 425/201 |
| 3,841,814 A | * | 10/1974 | Eckhardt | 425/208 |
| 3,910,346 A | * | 10/1975 | ter Braak | 165/109.1 |
| 4,022,440 A | * | 5/1977 | Kawamura et al. | 366/76.7 |
| 4,174,907 A | * | 11/1979 | Suh et al. | 366/279 |
| 4,198,383 A | * | 4/1980 | Konsetov et al. | 422/134 |
| 4,744,521 A | * | 5/1988 | Singer et al. | 241/66 |
| 5,141,328 A | * | 8/1992 | Dilley | 366/305 |
| 5,335,992 A | * | 8/1994 | Holl | 366/348 |
| 5,535,175 A | * | 7/1996 | Niimi | 366/336 |
| 5,538,191 A | * | 7/1996 | Holl | 241/1 |
| 5,674,004 A | * | 10/1997 | Takeuchi | 366/69 |
| 6,471,392 B1 | * | 10/2002 | Holl et al. | 366/279 |
| 6,632,014 B2 | * | 10/2003 | Steinberg et al. | 366/315 |
| 6,752,529 B2 | * | 6/2004 | Holl | 366/279 |
| 6,770,340 B2 | | 8/2004 | Zumbrunnen et al. | |
| 6,902,805 B2 | | 6/2005 | Zumbrunnen et al. | |
| 7,001,571 B2 | * | 2/2006 | Forney et al. | 422/22 |
| 7,122,161 B1 | * | 10/2006 | Moritz et al. | 422/209 |
| 2005/0113503 A1 | | 5/2005 | Zumbrunnen | |

(Continued)

OTHER PUBLICATIONS

Zumbrunnen, D. A., "Smart Blending: Functional Fine-Scale Structures . . . ," ASME/JSME Summer Fluids Eng., FEDSM2003-45051, Am. Soc. Mech. Eng., New York, Jul. 6, 2003.

(Continued)

*Primary Examiner*—Tony G Soohoo
(74) *Attorney, Agent, or Firm*—Leigh P Gregory

(57) ABSTRACT

A blending system incorporating a blender with an operating cavity housing a plurality of elongate rod elements extending at least partially along the length of the operating cavity such that controlled relative movement between the rod elements and a multi-constituent composition within the operating cavity causes the development of predefined structures within the multi-constituent composition. The cavity within the blender incorporates a diminished cross-section in the vicinity of its terminal end. Methods to provide controlled development of microstructures and properties are also provided.

28 Claims, 16 Drawing Sheets

U.S. PATENT DOCUMENTS

2005/0265119 A1* 12/2005 Zumbrunnen ............... 366/97
2007/0135553 A1* 6/2007 Zumbrunnen ............. 524/445

OTHER PUBLICATIONS

Dhoble, A. V., Zumbrunnen, D. A., "Controllable Morphology Development . . . ," 62nd Ann. Tech. Conf., Soc. Plastics Eng., BOston, Ma, 2005, pp. 238-243.

Kulshreshtha, B. et al., "Novel Immiscible Polymer Blend Morphologies . . . " Polym Films and Fibers Symp., MOntreal, Can., Sep. 2004, 9pgs.

Zumbrunnen, D. A., et al., "Key Concepts in Blend Morphology Development . . . ," America's Reg, Mtng., Polymer Proc. Soc., Quebec City, Canada, 2005, 2pgs.

Chougule, V., Zumbrunnen, D. A., In Situ Assembly Using a Continuous Chaotic Advection Blending Process . . . , Chemical Engineering Science, (60), pp. 2459-2467, 2005.

Dhoble, A. et al., , "Mechanical Properties of PP-LDPE Blends with Novel Morphologies Produced with a Continuous Chaotic Advection Blender," Polymer, (46), p. 2244-2256, 2005.

LaCoste, A.. et al., , "Advancing Controlled Release Packaging Through Smart Blending," Packaging Technology and Science, (18), p. 77-87, 2005.

Zumbrunnen, D. A., et al., "On-Line Morphology Control Features . . . " Proceedings of the 63nd Annual Tech. Conf, Soc. of Plastics Eng., Boston MA, 2005, p. 238-243.

* cited by examiner

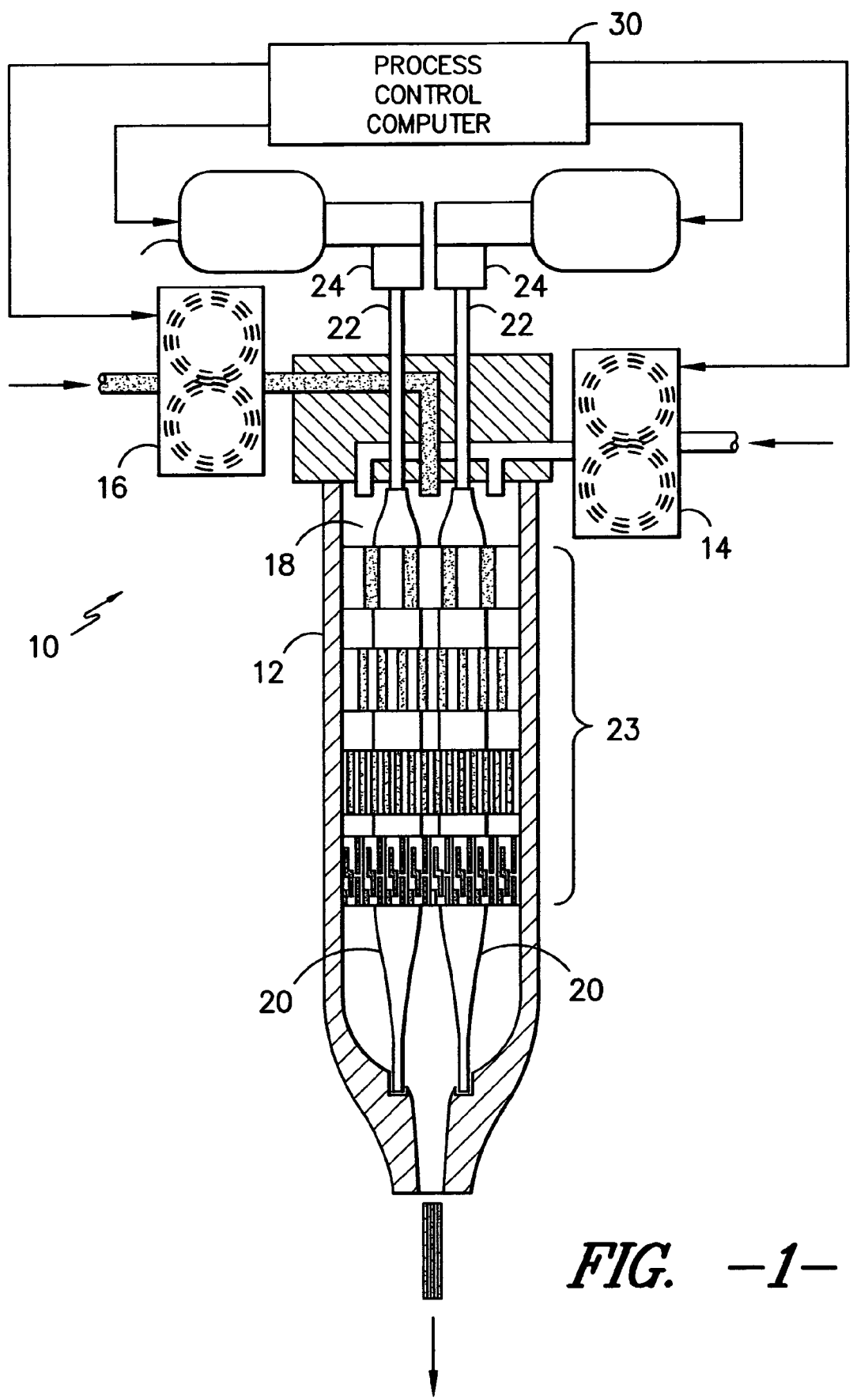
FIG. -1-

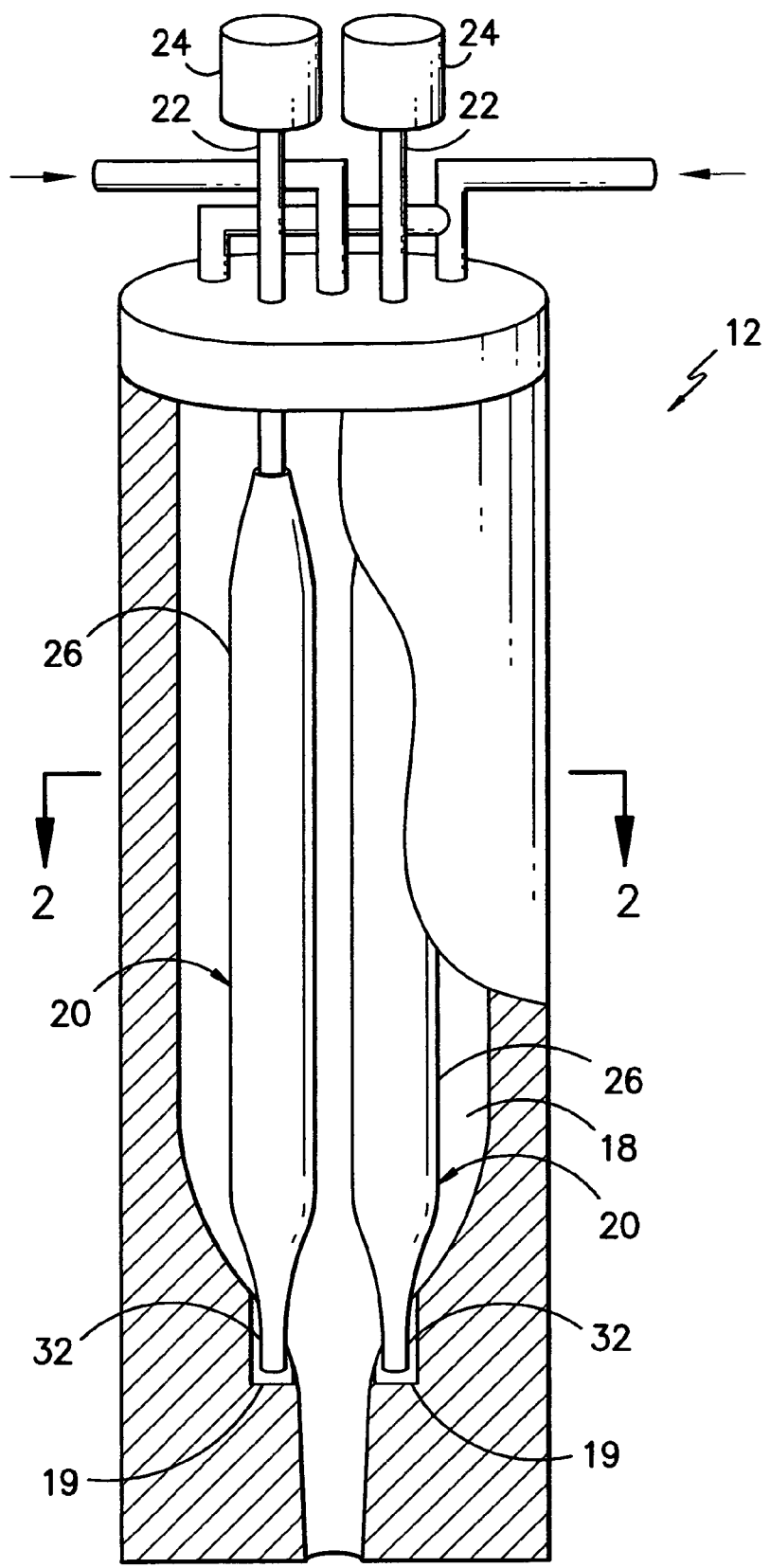
FIG. —1A—

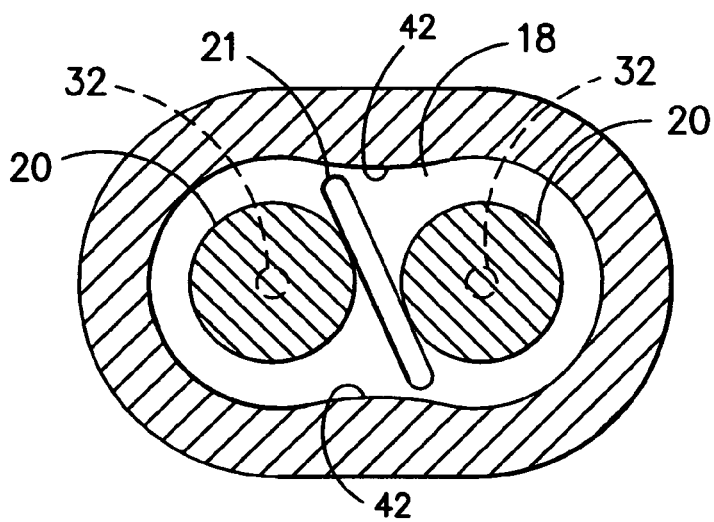
FIG. -2-
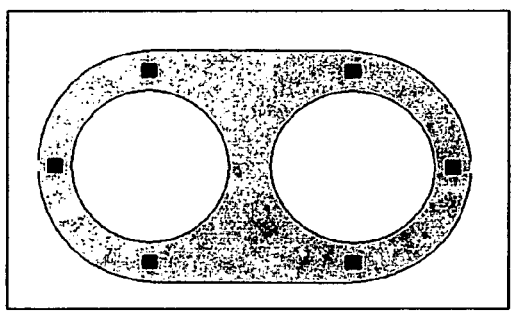
N=0
FIG. -3A-
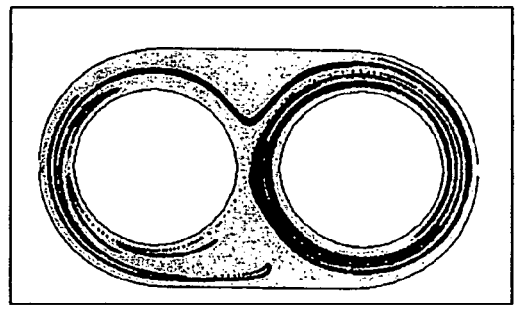
N=1
FIG. -3B-
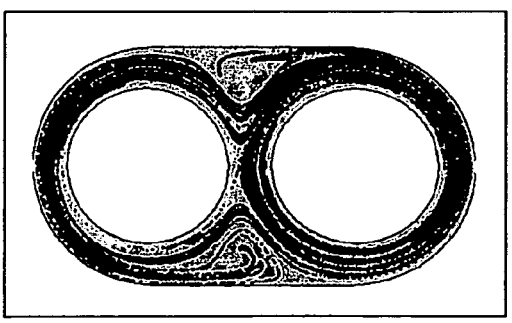
N=2
FIG. -3C-
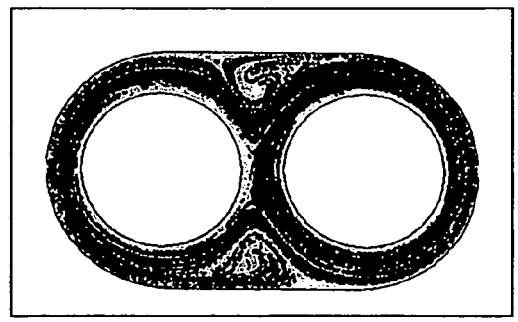
N=3
FIG. -3D-

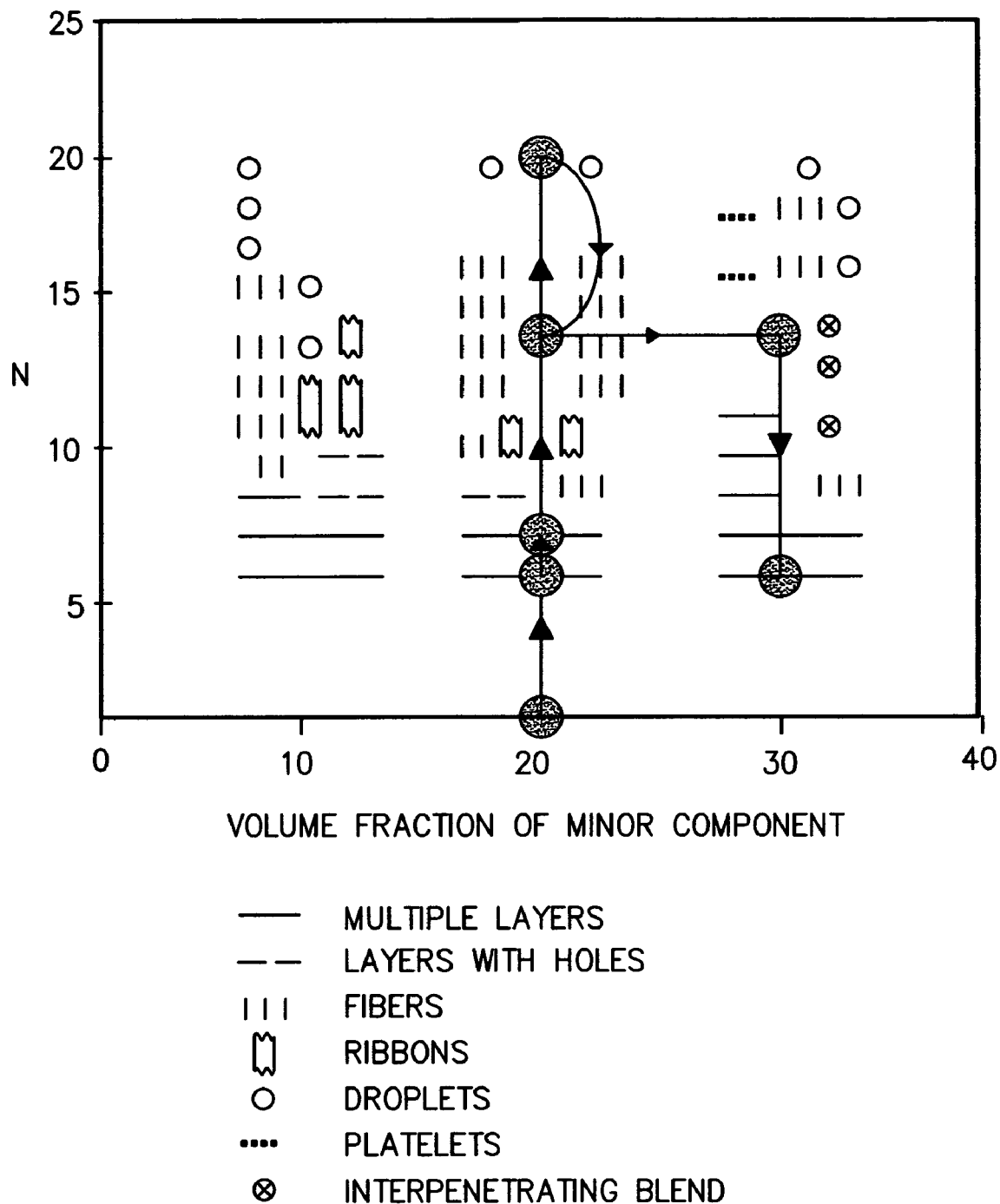
FIG. —4—

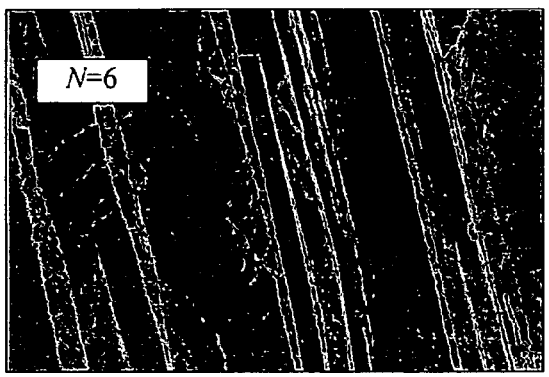
FIG. -5A-
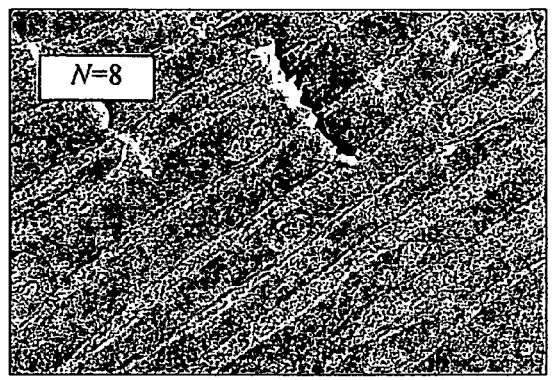
FIG. -5B-
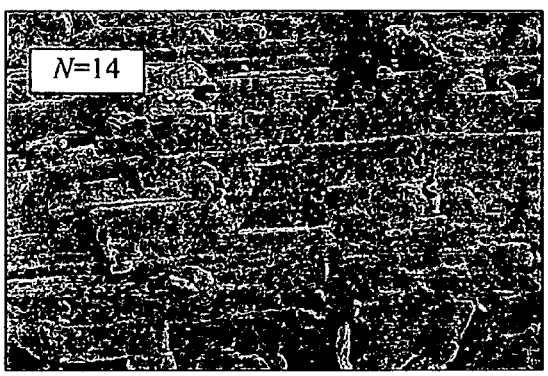
FIG. -5C-
FIG. -5D-

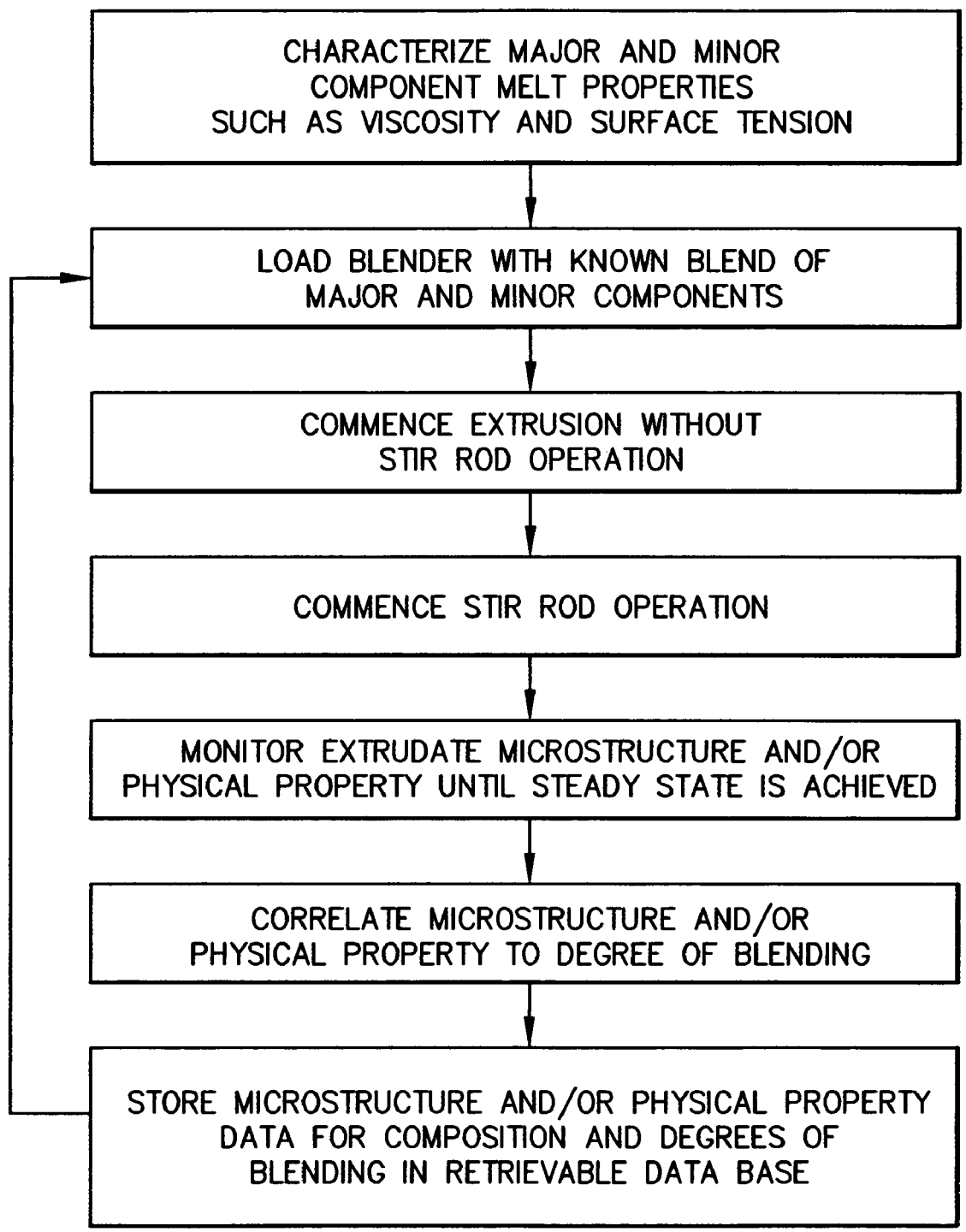
FIG. —6—

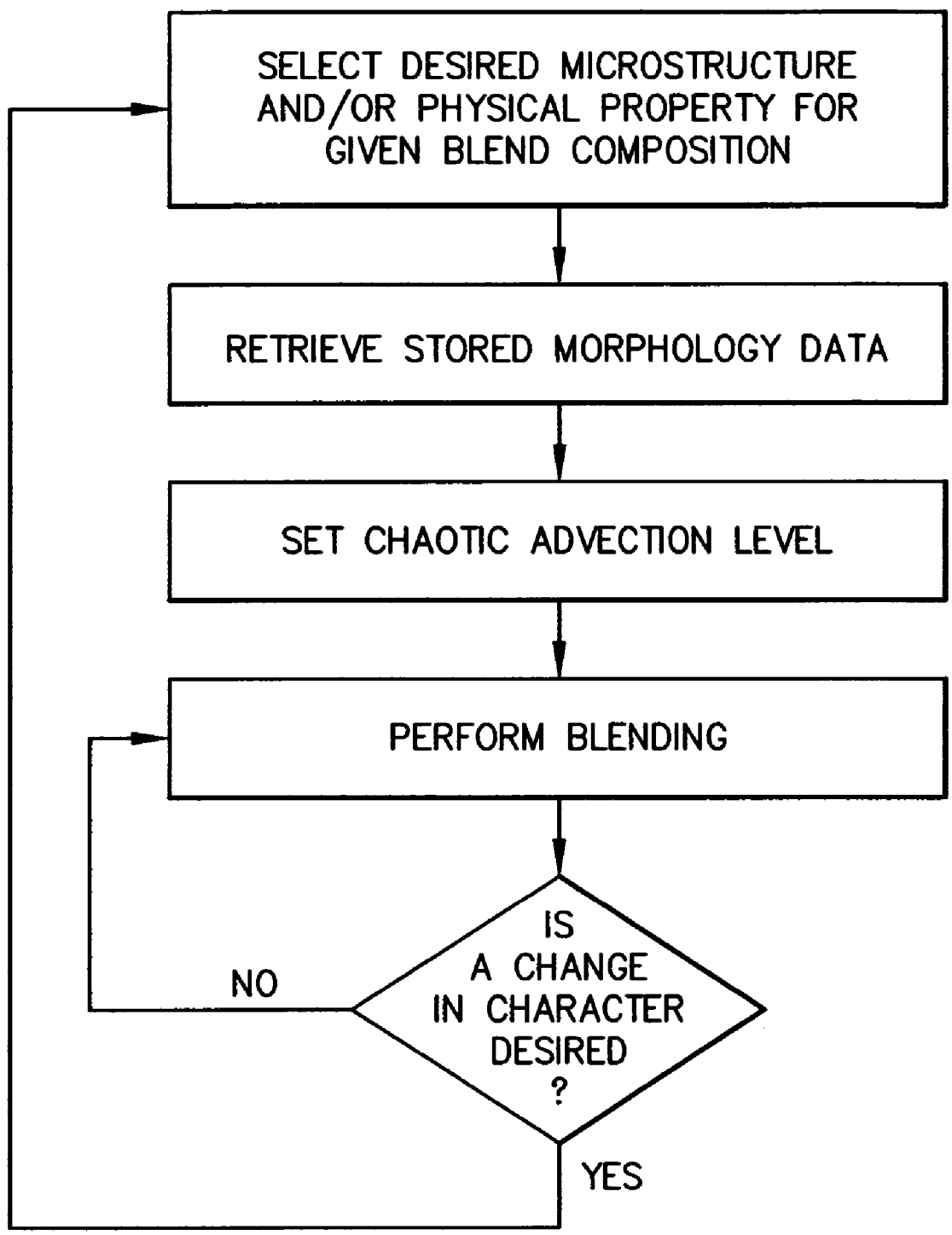
FIG. —7—

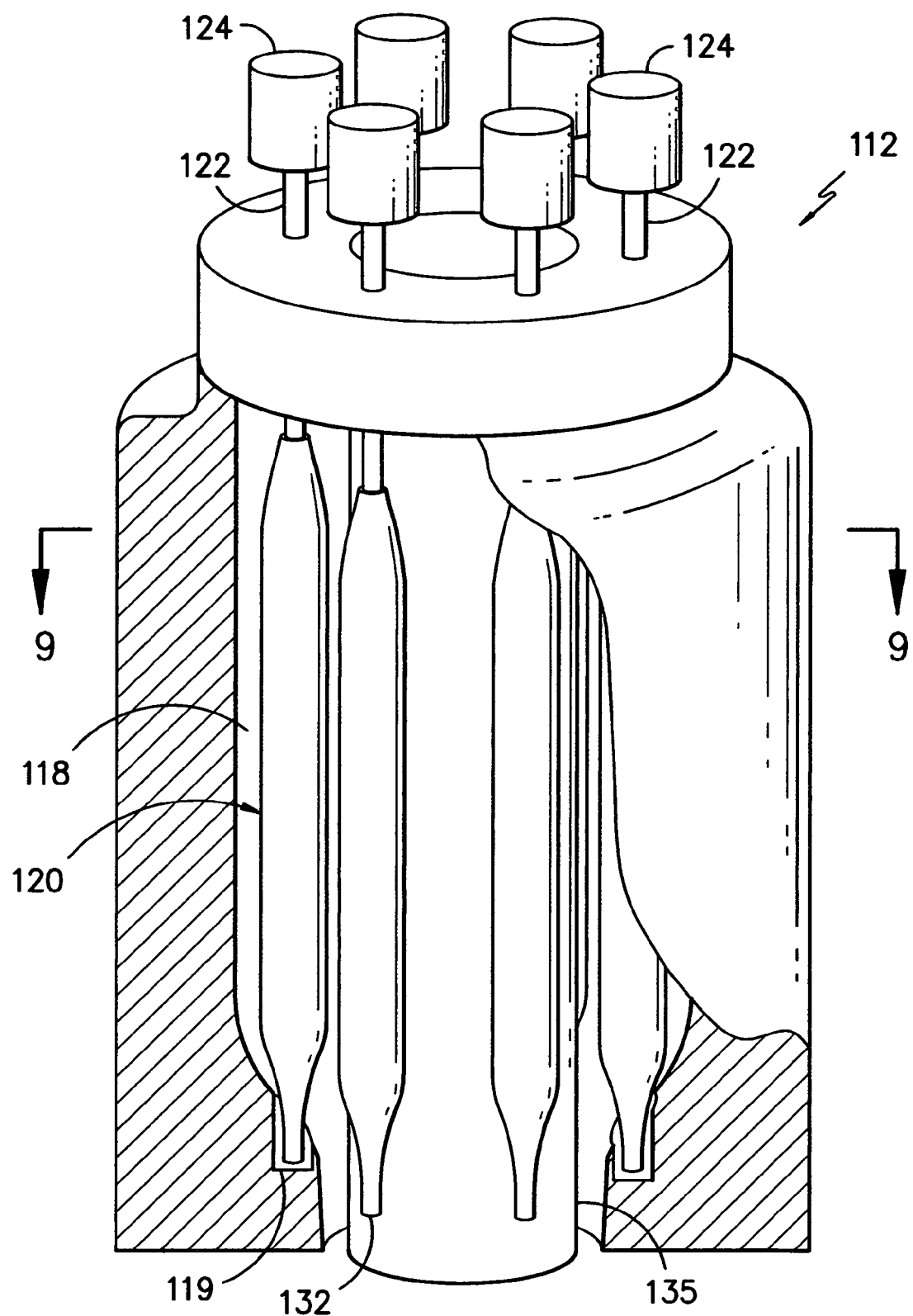
FIG. -8-

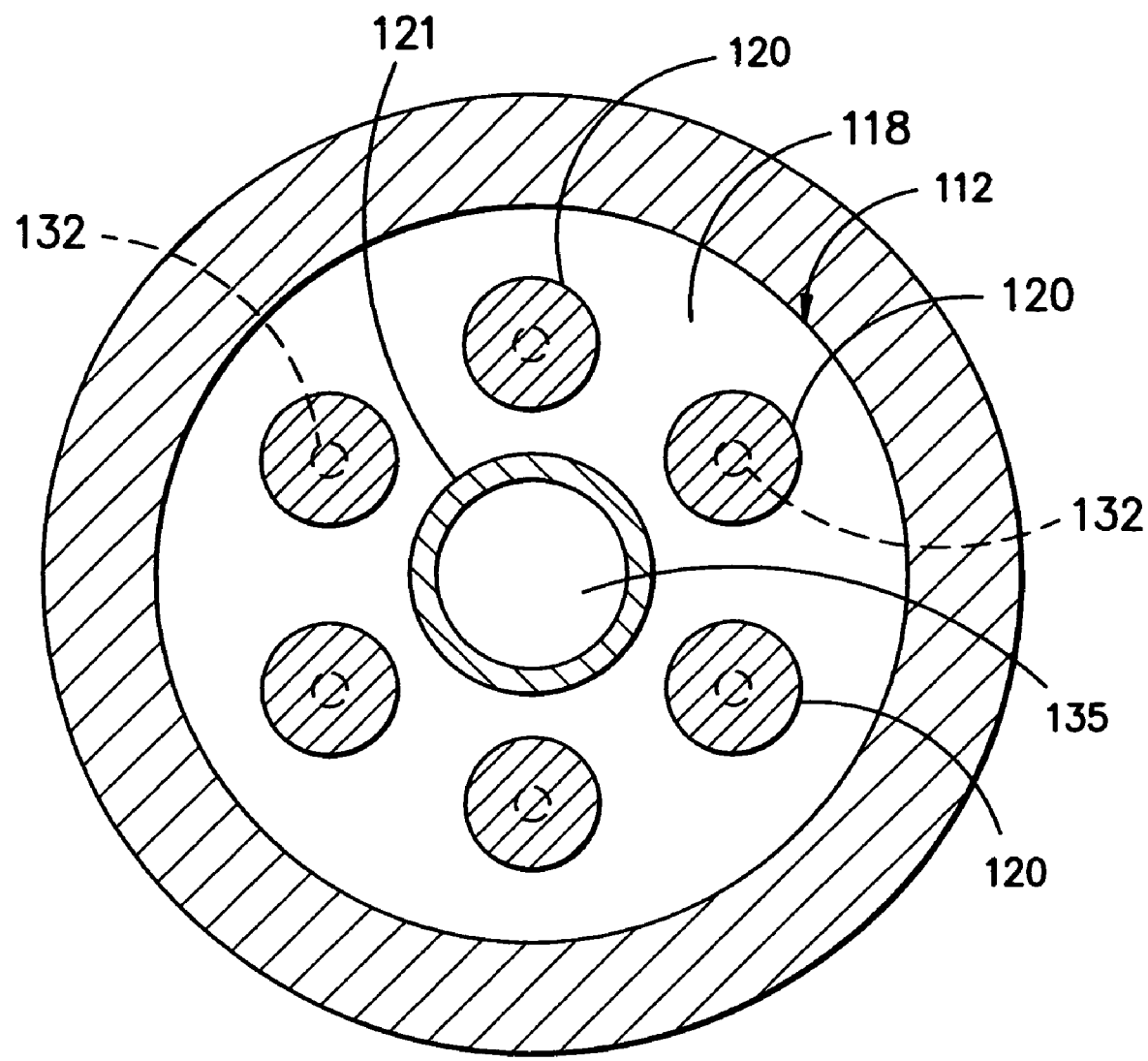
FIG. -9-

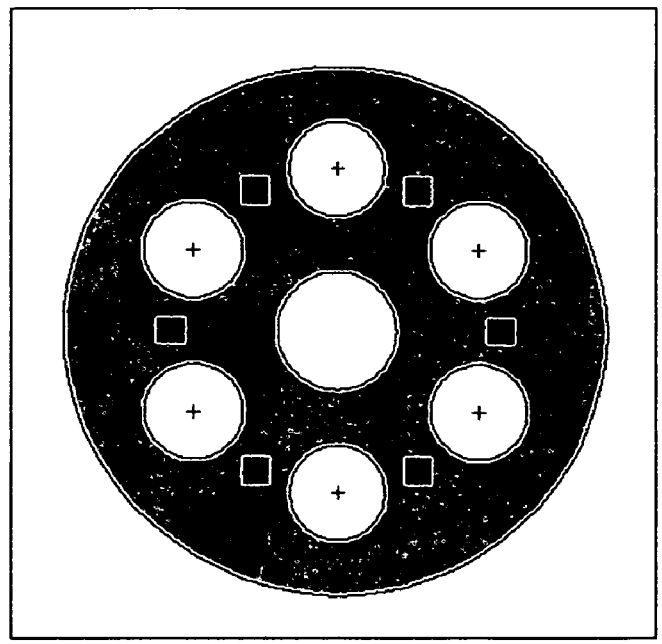
N=0
FIG. −10A−
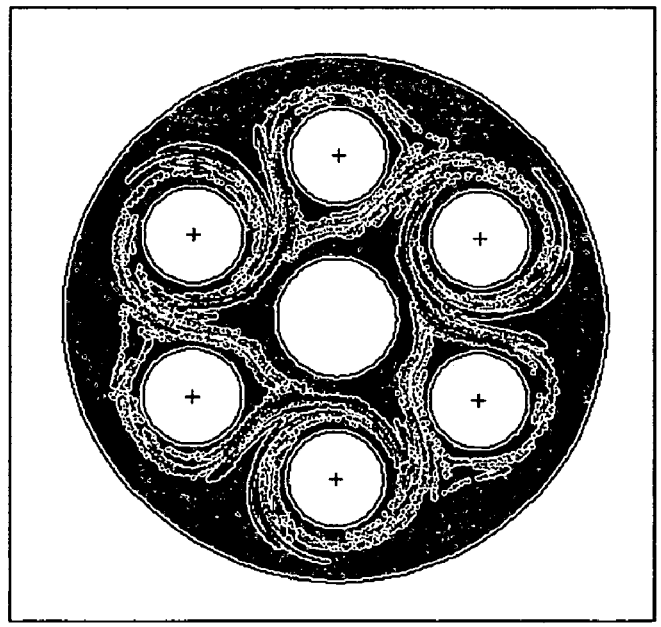
N=5
FIG. −10B−

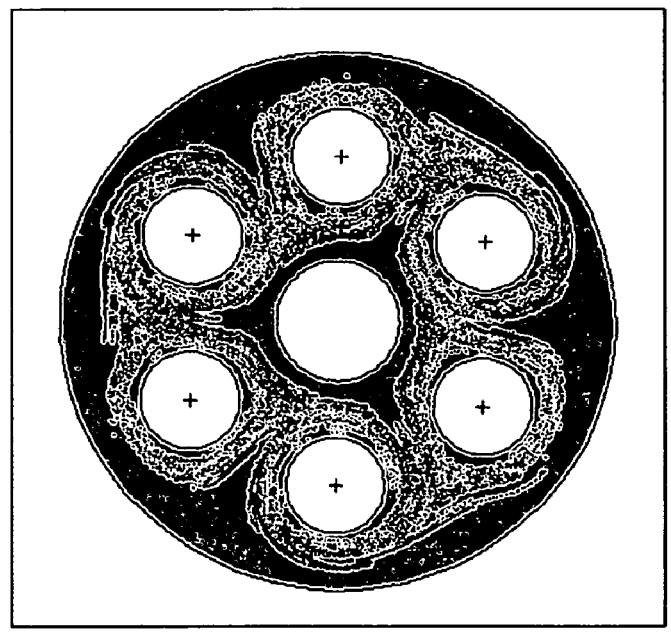
N=10
*FIG. −10C−*
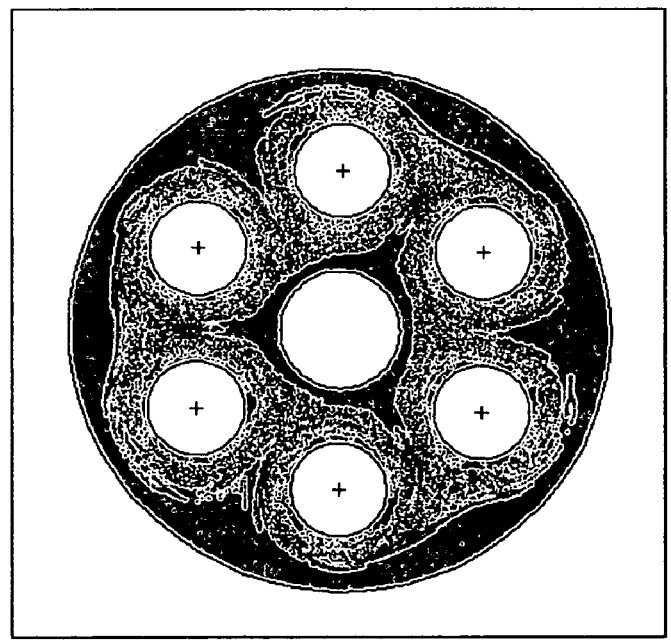
N−15
*FIG. −10D−*

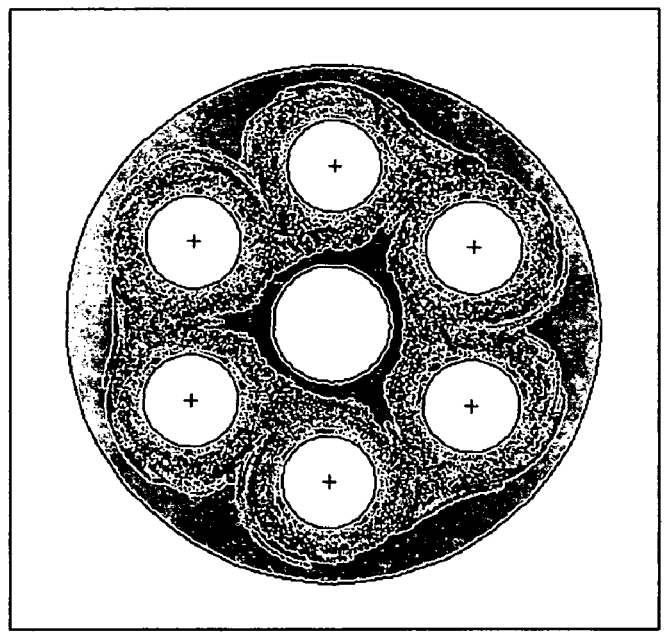
N=20
*FIG. —10E—*
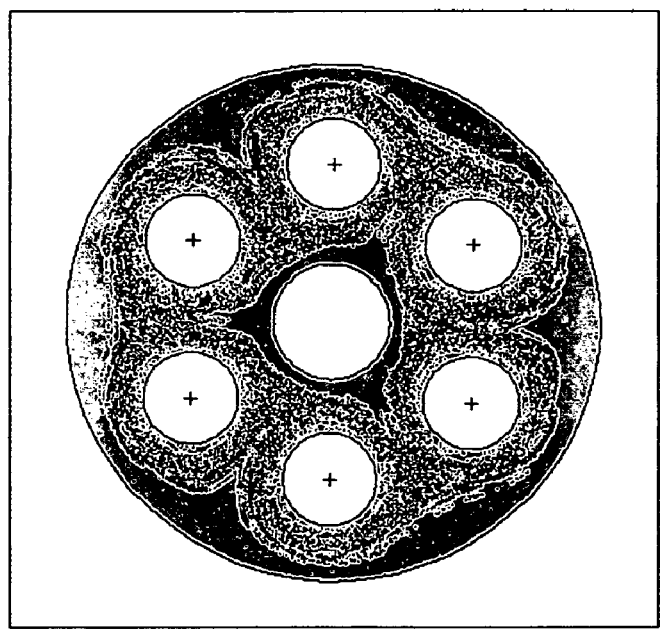
N=25
*FIG. —10F—*

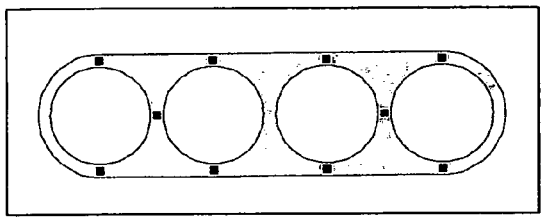
N=0
FIG. −11A−
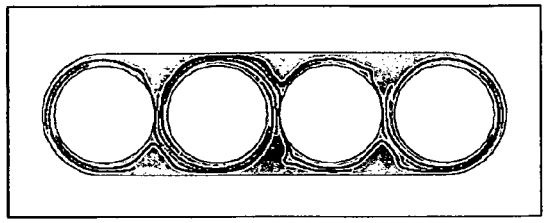
N=1
FIG. −11B−
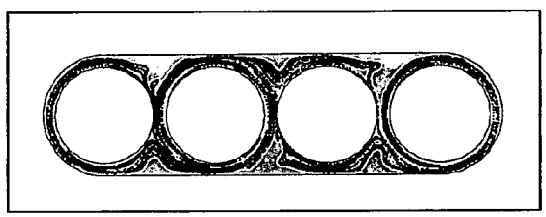
N=2
FIG. −11C−
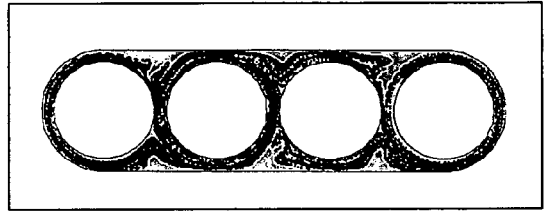
N=3
FIG. −11D−
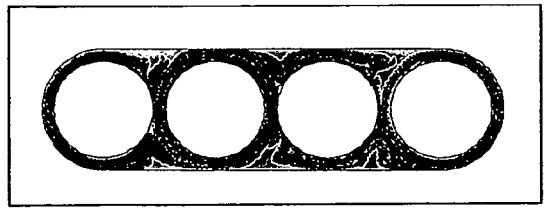
N=4
FIG. −11E−
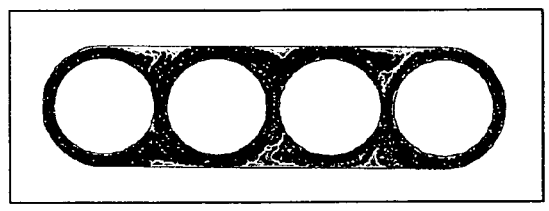
N=5
FIG. −11F−

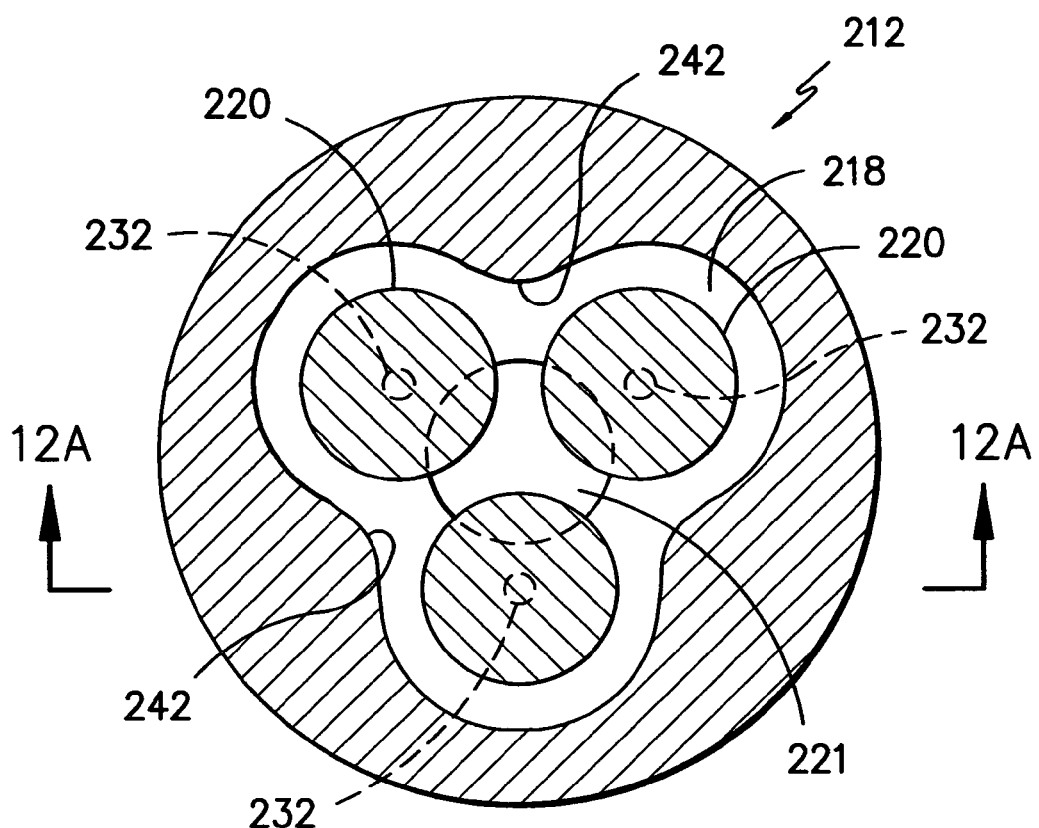
FIG. -12-
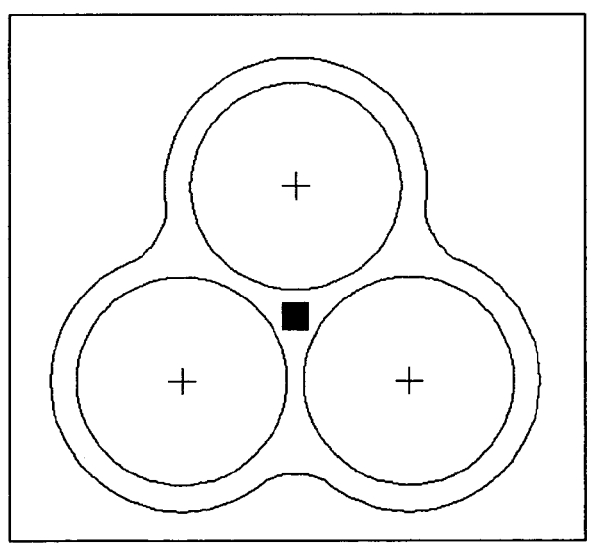
N=0
FIG. -12B-

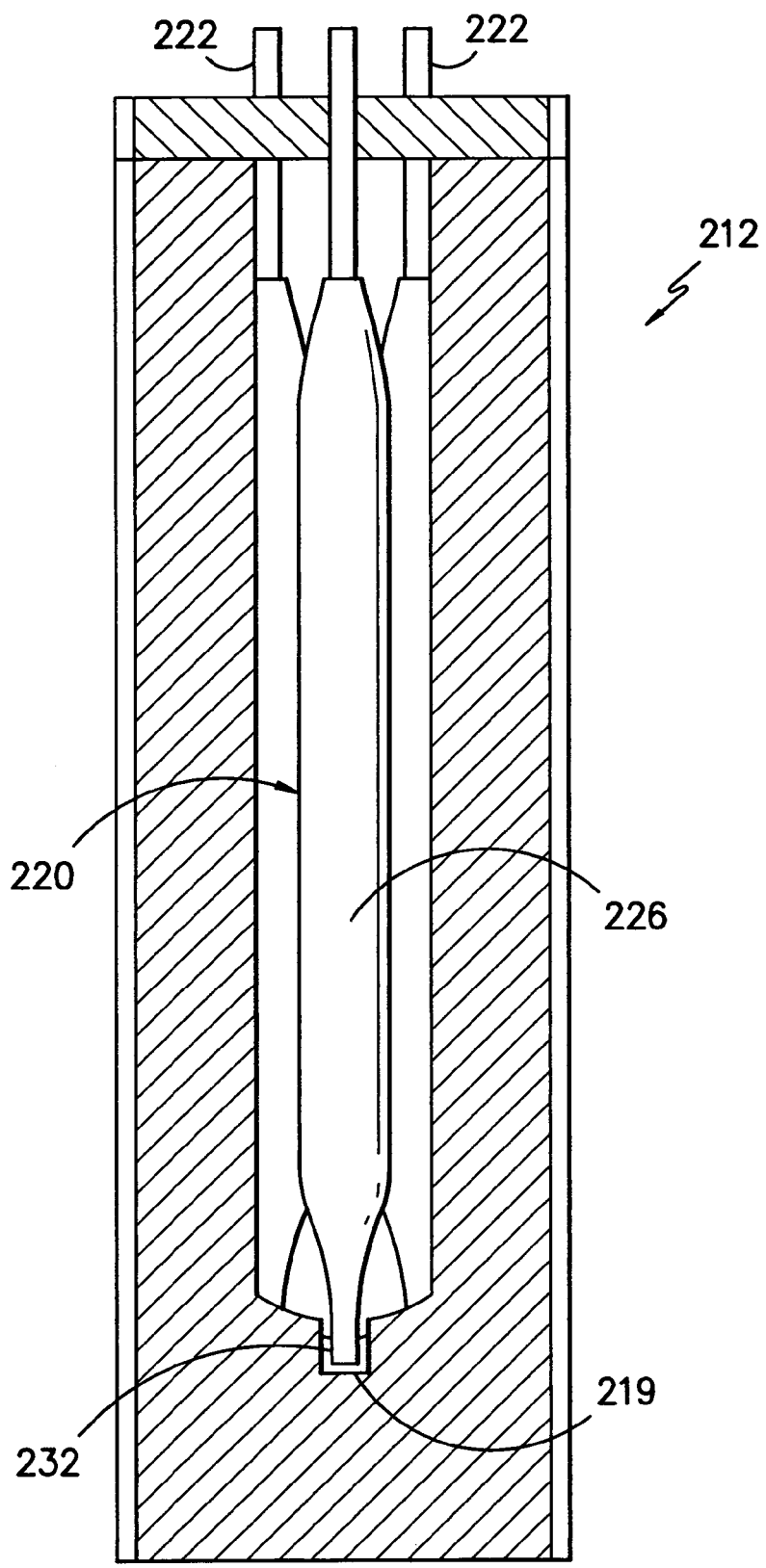
FIG. —12A—

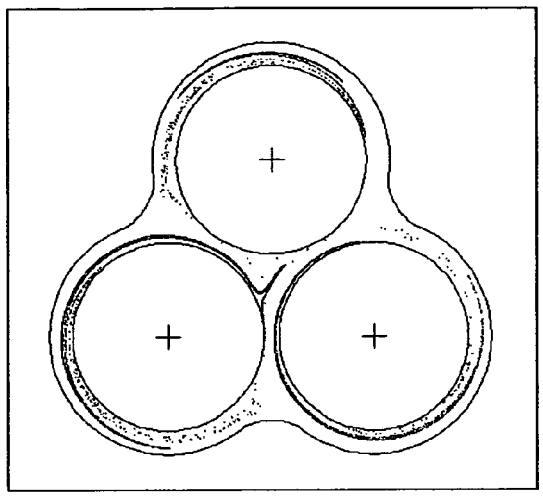
N=2
*FIG. -12C-*
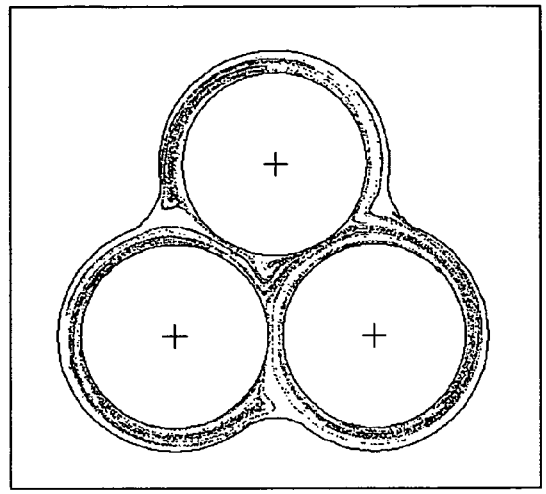
N=4
*FIG. -12D-*
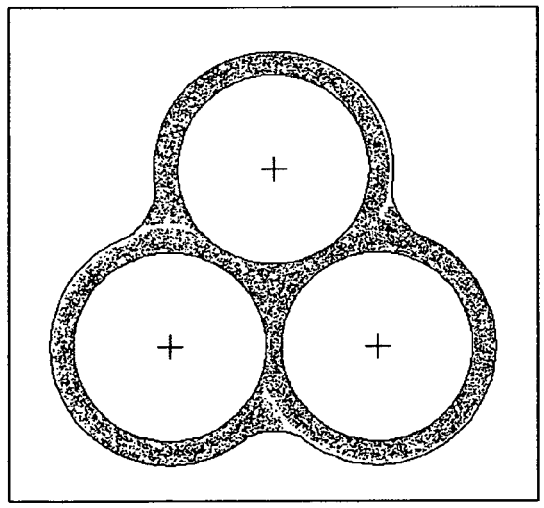
N=8
*FIG. -12E-*
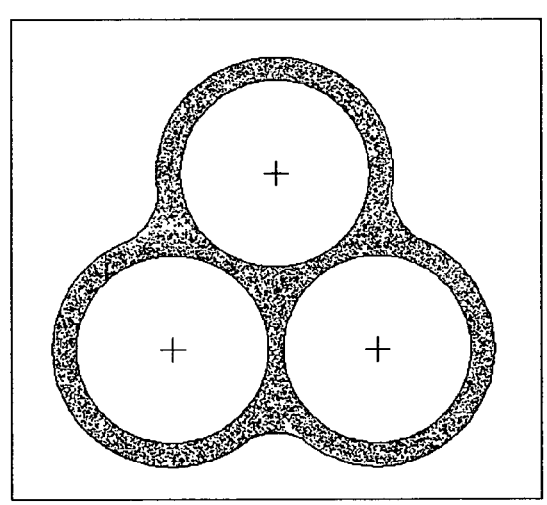
N=12
*FIG. -12F-*

MULTI-COMPONENT BLENDING SYSTEM

CROSS-REFERENCE TO RELATED APPLICATION

This application claims the benefit of and priority from my U.S. provisional application No. 60/575,552 filed May 28, 2004. The contents of such provisional application and all patents referenced herein are hereby incorporated by reference as if fully set forth in their entirety.

TECHNICAL FIELD

The present invention is directed generally to controllable blending systems adapted and operated for the structured blending of multiple components. The invention is further directed to methods for the production of structures within multi-component blended compositions using predictive models. More particularly, the invention is directed to a system including blending equipment and operating procedures for the controlled blending of two or more constituents to produce predefined and controllable morphology characteristics within a blended composition resulting in controllable and predictive morphology characteristics within an extrudate or other formed structure exiting the system.

BACKGROUND OF THE INVENTION

It is generally known that two or more constituent materials can be mixed to obtain a composition in which the constituents are substantially completely dispersed so as to yield a homogenous final composition of predefined character. Such practices may be carried out by known equipment such as screw extruders and blade blenders and yield extruded or batch compositions of generally consistent non-alterable morphology. The properties of such compositions are thus defined almost exclusively by the compositional character of the blended material without regard to structure. That is, the dispersed individual constituents are not controlled in a manner to impart particular desired structural characteristics.

It has been proposed to use so-called smart blenders based on chaotic advection (also known as chaotic mixing) to produce controlled morphological characteristics within a resulting extrudate. Such systems are disclosed, for example, in my U.S. Pat. No. 6,770,340, the contents of which are hereby incorporated by reference in their entirety. As will be appreciated, unlike mixers such as screw extruders and the like that do not have as a goal the formation of specific structures among material components, blenders based on chaotic advection operate to stretch and fold the constituents within the compositional blend to progressively develop a defined sequence of physical structures that are retained within the blend composition following extrusion. Thus, by controlling the degree of blending, predefined morphological characteristics may be achieved within an extrudate formed from the blend composition.

SUMMARY OF THE INVENTION

The present invention provides advantages and alternatives over the prior art by providing systems and device features affording enhanced control over blend morphology development in static and/or dynamic operational modes. More particularly, the present invention provides a blending system incorporating a blender with an operating cavity housing a plurality of elongate rod elements extending at least partially along the length of the operating cavity such that controlled relative movement between the rod elements and a multi-constituent composition within the operating cavity causes the development of predefined structures within the multi-constituent composition. The cavity within the blender incorporates a diminished cross-section in the vicinity of its terminal end to increase exit speed and stability of the formed extrudate. Such control promotes maintenance and conveyance of developed morphological structures to the extrudate. The diminished cross-section also provides a support structure for fixture of stir rod ends.

According to one potentially preferred aspect, the blender is adaptable to carry out blending to a controlled degree based on instructions from a computer or other controller utilizing pre-established morphology data points for given compositions.

According to another potentially preferred aspect, the system is adaptable to dynamic changes to alter morphology along the length of an extrudate in a predefined manner so as to provide controlled on-line variability while operating if desired.

According to still another potentially preferred aspect, a method is provided for the establishment of processing parameters to yield pre-defined morphology characteristics within known compositions in either a continuous mode or a variable mode along the length of a produced extrudate.

According to one potentially preferred practice, a chaotic advection blending system is provided in operative communication with an information management system adapted to operate the blender. The blender includes an interior cavity housing a plurality of elongate rod elements or other moving surfaces extending at least partially along the length of the cavity towards an outlet to the blender. The outlet of the cavity is of reduced cross-sectional diameter relative to a blending zone housing the rod elements so as to impart increased velocity to the blend composition upon exit from the blender and to provide a support surface for tapered ends of the stir rods. The stir rods are preferably tapered in concert with the reduction in cavity cross-sectional diameter to provide a reducing cross-sectional area for flow and a hydrodynamically smooth transition to the cavity exit to thereby convey structured blends from the cavity with minimal disturbances. Chaotic advection is applied to a blend composition of two or more discrete constituents within the blending zone by relative movement between the rod elements and the blend composition. The degree of chaotic advection is controlled based on elected data reflecting predictable morphological characteristics at different levels of chaotic advection for the material composition being utilized. Based on such data, dynamic changes to the operation mode of the blender may also be instituted to adjust from a first defined structure to at least a second defined structure.

BRIEF DESCRIPTION OF THE DRAWINGS

A full and enabling disclosure of the invention including the best mode thereof is set forth more particularly in the remainder of the specification, including reference to the accompanying figures in which:

FIG. 1 illustrates a chaotic advection blending system for progressively developing pre-defined morphology characteristics maintained in stable relation within a multi-component extudate;

FIG. 1A illustrates a cut-away view of an exemplary two-rod blender;

FIG. 2 is a schematic view taken generally along line 2-2 in FIG. 1A illustrating a potentially desirable cross-sectional geometry for a cavity within a blender;

FIGS. 3A-3D illustrate the progressive folding and layer formation at progressing advection levels within a blender as illustrated in FIGS. 1 and 1A;

FIG. 4 illustrates an exemplary morphology map for defined percentages of major and minor component constituents at different levels of chaotic advective blending;

FIGS. 5A-5D are photomicrographs of solidified extrudate structures formed by different levels of advection and predicted by the map of FIG. 4;

FIG. 6 is a flow chart setting forth exemplary steps for the development of morphology data in the creation of a morphology map as illustrated in FIG. 4;

FIG. 7 is a flow chart illustrating use of stored morphology data to produce extrudates of desired character;

FIG. 8 illustrates a blending apparatus incorporating a plurality of rod elements within an annular blending chamber especially suited for tubes, blown film, and similar profiles;

FIG. 9 is a schematic view across the blending chamber taken generally along line 9-9 in FIG. 8;

FIGS. 10A-10F illustrate progressive blending at different levels of chaotic advection within an annular blender;

FIG. 11A illustrates a contemplated blender configuration utilizing a linear array of rods across a blending chamber;

FIGS. 11B-11F illustrate the progressive development of defined morphology utilizing the blender configuration as shown in FIG. 11A;

FIG. 12 is a cross sectional view looking towards the exit und of a blender having three rod elements arranged in a tri-lobal blending cavity;

FIG. 12A is a cut-away section view taken generally along line 12A-12A in FIG. 12; and;

FIGS. 12B-12F illustrate the progressive development of defined morphology utilizing the blender configuration as shown in FIG. 12.

DETAILED DESCRIPTION OF PREFERRED EMBODIMENTS

Reference will now be made in detail to various embodiments and practices in accordance with the invention. As will be appreciated, such exemplary embodiments and practices are provided by way of explanation only and not limitation. It will be apparent to those skilled in the art that various modifications and variations may be made to the illustrated and described embodiments and practices without departing from the spirit or scope of the invention. Accordingly, it is intended that the present invention shall extend to all such modifications and variations as may embody the general spirit of the invention within the full scope thereof. In this regard it is to be understood that all constructions described herein are fully scalable. Thus, any dimensions provided are for explanatory purposes only and may be adjusted proportionately to provide substantially equivalent performance in larger and smaller scale environments.

Referring to the figures wherein like reference numerals designate like features in the various views, in FIG. 1 a simplified embodiment of a chaotic advection blending system 10 is illustrated. The system includes a blender 12 as will be described more fully hereinafter in fluid communication with a first delivery unit 14 and a second delivery unit 16 for conveyance of constituent materials to a cavity 18 at the interior of the blender 12. By way of example only, and not limitation, it is contemplated that the delivery units 14, 16 may be metering pumps or the like suitable for delivering controlled quantities of fluidized constituents to the blender 12. In this regard, it to be understood and appreciated that the fluidized constituents may be of any suitable form such as liquid phase polymers, powders, solids, or the like that behave in a fluid manner. According to one contemplated practice, the first delivery unit 14 delivers a first major percentage liquid phase polymer to the blender 12 while the second delivery unit 16 delivers a second different minor percentage liquid phase polymer to the blender 12. The first delivery unit 14 and the second delivery unit 16 are preferably controllable independently of one another such that virtually any ratio of constituents may be delivered to the blender 12. Of course, it is contemplated that additional delivery units delivering the same or different constituents may likewise be utilized if desired.

As best illustrated through simultaneous reference to FIGS. 1, 1A and 2, the blender includes a multiplicity of elongate rod elements 20 extending along the length of the cavity 18. As will be described further hereinafter, the rod elements 20 are preferably tapered at their distal ends in concert with a tapered reduction in the cross-section of the cavity 18. Such corresponding tapered reductions may promote a hydrodynamically smooth increase in velocity of the blend composition as it exits the blending cavity for conveyance through a terminal end discharge opening 21. As shown, the proximal ends of the rod elements 20 are operatively connected through rod extensions 22 to controllable motion inducing elements 24 such as variable speed motors or the like. Alternatively, it is contemplated that the body of the blender 12 may be mounted within, or otherwise operatively connected to, an element that imparts a rotational and/or oscillatory movement to the blender body. By way of example only, and not limitation, the blender 12 may be mounted in shell carrier that in turn is operatively connected to a variable speed motor so as to rotate and/or oscillate the blender body relative to the rod elements 20. In such a practice, it is contemplated that the rod elements 20 may remain stationary or may be operatively connected to motion inducing elements to impart complementary movement.

Regardless of the arrangement used to provide relative rotational and/or oscillatory movement within the system, it is contemplated that the constituents provided by the delivery units 14, 16 will engage the rod elements 20 in a substantially controlled manner so as to progressively develop microstructures that are formed in a controlled predefined sequence along the length of a blending zone 23 within the cavity 18. Importantly, the degree of microstructure development progression is a controllable function that is defined by the degree and duration of relative movement between the rod elements 20 and the delivered constituents within the cavity 18.

The progressive controllable development of defined microstructures within the blender 12 is caused by the repetitive stretching and folding of the constituents within the blender 12 as they engage the rod elements 20. This repetitive stretching and folding of the constituents within the blender 12 gives rise to the formation of layered structures that reduce in thickness at enhanced blending levels. As the layers become ever thinner, holes (i.e., ruptures) are developed within the layers with such holes increasing in size and concentration at increased blending levels. Thus, by controlling the degree of blending, the portions of the layers between the holes may be formed into predefined structures such as fibers, ribbons, droplets, or platelets until such time as blending is so complete as to yield a fully interpenetrating blend. Thus, by controlling the degree of blending, the microstructure within the blended composition can likewise be closely controlled.

The progressive controllable microstructure development is illustrated in cross-section in FIGS. 3A-3D as generated by a computational model for a two rod blender as illustrated in FIG. 1A. Thus controllable structuring process has been documented experimentally in polymer blends and is described in U.S. Pat. No. 6,770,340. In these figures, a relative degree of blending is designated as N. As can be seen in this computational model, the minor blending constituent shown in black is converted to layers of increasing number and decreasing thickness as N increases. Thus, a layered structure of the minor component within the matrix of the major component is established. It is to be understood that N (i.e. the degree of blending) may be defined in terms of any convenient protocol as may be desired. By way of example only, and not limitation, in the computational model yielding FIGS. 3A-3D, N=1 corresponds to the first rod rotating clockwise 3 rotations while the second rod simultaneously rotates clockwise 1 rotation followed by the first rod rotating clockwise 1 rotation while the second rod rotates simultaneously clockwise 3 rotations. N=3 corresponds to repeating the sequence 3 times. Importantly, it has been found that for a given ratio of blend constituents, a given degree of blending yields substantially consistent and predictable microstructure characteristics. Such consistent results permit the establishment of predictive models that may be used in combination with predefined stir rod protocol to generate predetermined microstructure characteristics for a given blend composition.

By way of example only, FIG. 4 provides a predictive microstructure map for different levels of low-density polyethylene as a minor component blended into polypropylene as a major component with different levels of blending. Such a map is formed by establishing a stir rod protocol and thereafter subjecting different blends of major and minor constituents to different levels of blending carried out in accordance with a defined rod protocol. The resultant microstructure within the extrudate exiting the blender is then determined such as by microscopy examination and recorded in a database used to form the map. Alternatively, resulting physical properties of the extruded blends ends such as electrical resistivity, stiffness, toughness, permeability or the like can be measured and used to form a database. As may be seen by simultaneous reference to the map in FIG. 4 and the structural photomicrograph in FIGS. 5A-5D, for the blend composition containing 20% LDPE at N=6, the formed structure is characterized by relatively thick layers. At N=8, the layers have become thinner and have developed intermittent holes thereby leading to a structure including elongate fibers. At N=14, the microstructure takes on the construction corresponding to an array of substantially aligned fibers. At N=18, the minor component LDPE is substantially in the form of droplets within the major component matrix. As will be appreciated, in a compositional blend, physical properties such as viscosity, electrical conductivity, interfacial tension, heat capacity and the like may also vary based on the degree of blending. Accordingly, it is contemplated that maps for such properties may likewise be produced and utilized in predictive blend processing.

It has been found that the development of a microstructure or physical characteristic map for different blend compositions may be produced relatively easily for any given stir rod protocol. A procedure for developing such morphology maps is set forth in the flow chart provided at FIG. 6. In such a practice, a blender 12 such as previously described is loaded with major and minor components in a known ratio and allowed to reach a steady state extrusion without stir rod operation. The extrudate structure formed without stir rod operation thus corresponds to a blending degree of N=0. Once a steady state baseline condition is achieved, blending may thereafter be commenced according to the prescribed protocol. The microstructure or physical property of the extrudate is then monitored until a blended steady state condition is achieved. The various segments along the extrudate length are thus subjected to different levels of blending resulting in variable microstructure or physical property along the length. At a known rate of extrusion, the degree of blending applied at any point along the length of the extrudate is also known thereby forming a physical model corresponding to the microstructure or physical property map for that compositional blend. Data for that compositional blend can thereafter be stored in retrievable database for future use and the blender can thereafter be loaded with a different composition to produce another collection of retrievable microstructure or physical character data points.

The achieved microstructure or physical characteristic is a function of both the blend composition as well as the degree of blending. Thus, the system of the present invention provides degrees of freedom to achieve a desired microstructure and/or physical character by adjusting the degree of blending and/or the compositional makeup. Once the database information has been established for a given rod protocol, a predetermined desired microstructure and/or physical character can be achieved in a given blend composition by subjecting the composition to a defined level of blending. The ability to achieve predictable and controllable microstructures and physical characteristics thus permits the ability to build structures in a defined and predetermined manner. Moreover, microstructure and/or physical character may be readily changed or adjusted as desired by simply adjusting the level of applied advection.

According to a potentially important practice, different microstructure and/or physical characteristics may be imparted along the length of a common extrudate formation. By way of example only, in FIG. 7 a flow diagram is illustrated setting forth basic steps in achieving desired characteristics. As shown, in this process, a user selects a desired blend composition in combination with a desired microstructure and/or physical property characteristic. The user may then retrieve stored data for the blend composition and set a chaotic advection level within the blender to achieve the desired microstructure or physical character corresponding to that chaotic advection level as predicted by the stored data. The blend composition may thereafter be processed at the set chaotic advection level so as to produce the desired characteristics. As reflected by the flow chart, as well as the map of FIG. 4, microstructure and physical properties may be changed virtually at will by simply retrieving stored data for the newly desired structure and resetting the advection level accordingly. By way of example only, and not limitation, a user may change from the characteristics corresponding to N=5 to the characteristics corresponding to N=25 or vice versa by adjusting the controllable motion inducing elements associated with the system accordingly. Moreover, for a given degree of blending, microstructure and/or physical properties can also be adjusted by changing the ratio of the constituents being blended. Thus, consistent or variable characteristics may be achieved along the length of an extrudate.

By way of example only, and not limitation, the ability to select and adjust microstructure characteristics is illustrated by the processing path as defined by arrows in the map of FIG. 4. As shown, by processing a blend composition having 20% low-density polyethylene as a minor component blended into polypropylene, microstructure can be progressively developed from relatively thick multiple layers at N=6 through a zone of fibers at N=14 to a zone of droplets at N=18. Thereafter, by reducing the chaotic advection level back to N=14, a regressive variation back to the microstructure of fibers is imposed. This demonstrates the ability to regress or retreat from one stage of microstructure development to an earlier stage of morphology development substantially on demand. As shown, adjusting the blend composition may provide still a further degree of freedom in establishing desired characteristics. In particular, for the map shown, at N=14, when the blend composition is adjusted from 20% to 30% LDPE, the microstructure changes from fibers to an interpenetrating blend. Of course, such a processing path is exemplary only, and virtually any path as may be desired may be utilized either manually or through the use of pre-programmed process control units. Moreover, as previously indicated similar processing paths can be established for controlling physical properties that vary with the degree of blending.

Referring back to FIGS. 1, 1A and 2, it is contemplated that the blender 12 is preferably configured in a manner so as to substantially avoid flow instabilities and stagnant regions within the cavity 18 for effective conveyance of the developed microstructures from the cavity to an outlet opening 21 such as a film die or other attachment as may be utilized. As previously noted, it is believed that such characteristics may be achieved by the use of a blending cavity 18 that tapers to a reduced flow area at its exit to preclude melt flow deceleration and resulting buckling of developed blend microstructures. Moreover, the rod elements 20 are also preferably tapered at their distal ends in the vicinity of the taper within the cavity 18 so as to facilitate a smooth transition from the cavity. Unless supported only at their driven ends, tapering of the distal ends also allows effective fixturing of the reduced diameter rod element ends within the tapered cavity wall.

As shown, the individual rod elements 20 preferably include an extended length bulbous body portion 26 extending along a blending zone 23 within the blending chamber for effective chaotic advection. The body portion 26 preferably is tapered to a reduced diameter distal end portion 32 for insertion within fixture openings 19 within the walls of the cavity 18 at a position upstream of the exit to the blending chamber 18. Preferably the relative degree of taper within the body of the blender 12 and the rod elements is similar so as to give a decreasing cross-sectional area for flow and resulting increase in melt velocity to promote structural stability of the blends formed within the blending chamber 18. The rod elements 20 are preferably substantially circular or elliptical in cross section. If desired, they may be contoured or roughened along their surface to include ridges, nodules or the like to increase surface area and improve contact with the blend composition. Due to the fact that polymer melts are generally viscous, a roughened rod surface may have minimal influence on the flow in the blender. Thus, advection occurs largely as with smooth surface rods. It is contemplated that such roughened stir rods may facilitate increased processing speed within the blender. It is also contemplated that combinations of rod elements with smooth and roughened surfaces may be utilized if desired. The rod elements 20 may be formed of materials such as aluminum, stainless steel, ceramics, high melting point polymeric materials or the like.

As will be appreciated, the tapered geometry of the rod elements 20 also facilitates insertion of the rod elements within the cavity 18 without encountering interference from the tapered walls of the blender. Moreover, the enhanced diameter body portion 26 increases the effective rod volume in the blending zone 23 of the cavity 18. In particular, the enhanced diameter body portion 26 reduces the volume occupied by the blend composition, thus reducing the composition residence time in the cavity 18. As will be appreciated, a reduced volume of blend constituents increases the percentage of the blend composition in contact with the rod elements 20. This, in turn, facilitates the development of desired structures by locating a greater percentage of the blend composition in contact with the rod elements. Moreover, by reducing residence time, an enhanced degree of control is available to an operator through adjustment of the blending parameters. That is, by reducing residence time, dynamic response to changes in blending parameters is more rapid.

By way of example only and not limitation, in one contemplated arrangement the rod elements taper from a diameter of about 1.3125 inches to about 0.2812 inches to establish a reduced diameter distal end 32 for insertion within the fixture openings 19 within the walls of the cavity 18. As previously noted, the containment walls of the cavity 18 are correspondingly tapered inwardly in the vicinity adjacent the tapered portions of the rod elements. According to one exemplary practice, in the tapering region of the cavity 18, the opposing sections of the containment walls are angled inwardly such that tangent lines running along the surfaces of the opposing sections form and angle of about 48 degrees. Of course, the degree of taper may be adjusted as desired to promote desired flow characteristics.

As illustrated, the tapering of the cavity containment walls is such that the containment walls cross the central axis of the rod elements 20. Thus, the reduced diameter distal ends of the rod elements 20 may be inserted directly into the fixture openings 19 such as drilled holes or the like extending from the blending chamber into the surrounding body of the blender as illustrated. In order to facilitate such insertion, it is contemplated that the distal ends of the rod elements will preferably maintain a relatively constant diameter for a sufficient distance to facilitate insertion. According to one contemplated practice, the portion of the cavity 18 housing the tapered containment wall sections may be a separate modular unit that is detachable so as to permit easy access to the distal ends of the rod elements. By way of example only, such a detachable arrangement may be achieved through use of a suitable flange or other joining technique as will be well understood by those of skill in the art.

It is to be understood that while it may be desirable to utilize tapered rod elements supported within the cavity walls, it is nonetheless contemplated that in any of the embodiments of the present invention other rod constructions such as substantially uniform diameter rods and the like may also be utilized if desired. Likewise, for any of the embodiments it is also contemplated that the cavity wall may provide a support surface for the distal ends of the rod elements by any suitable technique including, but not limited to, the use of housing openings within the cavity wall as illustrated as well as by the use of housing elements extending away from the wall towards the rod elements.

According to one contemplated practice, the cavity 18 may have a substantially oval cross-sectional geometry as shown in FIG. 2. As shown, it is also contemplated that the boundary walls of the blending cavity 18 may have a contoured or beveled profile with protuberant surfaces projecting inwardly relative to the rod elements 20 so as to further promote stable hydrodynamic flow. As shown, in the configuration illustrated in FIG. 2, the boundary walls include substantially smooth rounded contour protuberant portions 42 of curved profile projecting inwardly generally between the rod elements 20 thereby forming a slight dog bone cross section. The protuberant surfaces 42 further promote smooth and stable hydrodynamic flow and more uniform shear stress levels resulting from rod motions in the melt composition. In particular they may promote chaotic advection throughout the cavity and especially within regions that would be more distant from the rod surfaces if the protuberant surfaces were not present. By way of example only and not limitation, for a blending cavity housing rod elements 20 with an operative body portion diameter of about 1.3125 inches tapering to about 0.2812 inches as previously described, the interior cross-section dimensions of the blending cavity 18 illustrated in FIG. 2 at the location where chaotic advection is prevalent may be about 3.5358 inches in length by about 2.0134 inches in width outboard of the protuberant portions and about 1.87 inches in width at the center of the protuberant portions. The protuberant portions may extend for a length of about 1.5224 inches along opposing sides of the cavity. This relative geometry may be maintained substantially along the length of the blending chamber including the reduced diameter portions adjacent the distal ends of the rod elements. As will be appreciated, in such a construction interference between the protuberant portions and the rod elements is avoided due to the complementary reduction in diameter of the rod elements. Moreover since the protuberant portions extend towards positions between the rod elements, the fixture housings 19 may be located in lower profile zones between the protuberant portions.

As illustrated in the cross-section of FIG. 2, it is contemplated that the discharge opening 21 such as a die slot or the like may be oriented at an angle to the major axis of the blending chamber 18. As will be appreciated, such an arrangement may facilitate the unobstructed attachment of the distal ends of the rod elements 20 into the fixture openings 19 at positions outboard of the discharge opening while also potentially reducing any disturbances from the rod fixtures in the discharged melt.

As shown, the proximal ends of the rod elements 20 are also preferably tapered to give extended length reduced diameter rod extensions 22 for operative connection to controllable motion inducing elements 24 such as variable speed motors or the like. By way of example only and not limitation, a rod element 20 as previously described having an operative diameter of 1.3125 inches may taper to a diameter of about 0.475 inches at its proximal end in the vicinity of input ports to the chamber. Such reduced diameter may aid in the input of blend constituents. The rod may then step down in diameter to the driven rod extensions having a diameter of about 0.2362 inches.

In the system illustrated in FIGS. 1 and 1A, a first major constituent is delivered from the first delivery unit 14 through a number of injection ports while a second minor constituent is delivered from the second delivery unit 16 through a single injection port. It is to be understood that such injection practices are exemplary only and that virtually any arrangement may be utilized as desired. However, injection is preferably carried out such that injected streams have diameters greater than about 0.25 inches. Although such stream diameters may not be essential, it has been found that such relatively large stream dimensions may aid injected melts in more readily stretching and folding in response to chaotic advection even when impeded by interfacial tension and melt viscosity differences.

As previously indicated, the constituents injected for blending may be of virtually any suitable fluid form including liquid phase polymers, glasses, oils, pastes, and the like including combinations of any suitable materials. Importantly, it is contemplated that virtually any number of constituents may be introduced and processed to form desired structural characteristics. Thus, while a two input system is illustrated, it is likewise contemplated that three or more constituents may be blended if desired. Each of the constituents is preferably added by an independently controllable delivery unit such as a metering pump or the like so as to permit adjustment of the blended composition as desired.

It is contemplated that the system, according to the present invention, may be operated and adjusted either manually or through use of automated control systems such as process control computers, programmable logic controllers, or the like as will be well know to those of skill in the art. According to one potentially preferred practice, it is contemplated that the delivery units providing compositional components to the blender as well as the motion inducing elements operatively connected to the rod elements 20 are preferably linked to a process control computer 30 or programmable logic controller programmed with stored microstructure and/or physical property data for various constituent ratios and degrees of blending as previously described. Thus, for a desired composition, an operator may simply select a desired microstructure or physical property and then have the process computer control the constituent levels and the motion inducing elements to provide the degree of blending as required to provide the desired result. Of course, the process control computer 30 may also be programmed to vary the microstructure or physical properties along a length of the extrudate if desired.

As previously indicated, it is contemplated that systems according to the present invention are readily adaptable to various different blender configurations. By way of example only, an alternative embodiment is illustrated in FIGS. 8 and 9 wherein elements corresponding to those previously described are designated by like reference numerals within a 100 series. In the embodiment of FIGS. 8 and 9, a blender 112 is provided wherein the cavity 118 is of a substantially annular configuration arranged around a central core 135 so as to define an annular outlet 121. Such a construction may be particularly suitable for the production of so-called blown films which are extruded in a bubble-like formation at the exit of the blender 112 as well as other extrudates of hollow forms such as pipes, tubing and the like. As illustrated, in this construction, the blender 112 includes an arrangement of radially disposed elongate rod elements 120 for interaction with a blend composition in the annular cavity 118. As with the earlier described configuration, the boundary walls of the cavity 118 are preferably tapered inwardly towards the axis lines of the rod elements 120 in concert with a reduction in rod element diameter to promote a stable increase in speed of the blend composition. As in the prior described embodiment, the tapering of the rod elements 120 also aids in fixturing of the distal tips into the cavity wall.

As best illustrated through simultaneous reference to FIGS. 8 and 9, the cooperative tapering of the rod elements 120 and the cavity wall permits the straight line insertion of the rod elements 120 into fixture ports 119 at outboard positions relative to the outlet 121. Moreover, the reduction in cross-sectional area within the cavity as the outlet 121 is approached causes the blend composition to increase in velocity as it exits the blending zone within the blender 112 and thereby increases the stability of the formed extrudate so as to promote retention of the formed structures. The progressively reduced diameter of the rod elements in tandem with the convergent zone of the cavity 118 promotes a hydrodynamically smooth transition of the melt from the cavity exit.

As will be appreciated, the chaotic advection protocol used to achieve a desired character within an extrudate formed by the blender 112 may be established in the same manner as described in relation to the dual rod unit previously described. Thus, microstructure and/or physical property maps for given degrees of blending and compositional ratios may be established in the same manner. The microstructure or physical properties for known blending levels and compositions can thereby be readily specified.

By way of example only, and not limitation, FIGS. 10A-10F illustrate a representative predictive graphical model for a two constituent blend composition processed by the blender 112 wherein the light zones represent a major constituent and the darker zones represent a minor constituent additive both shown in cross-section. As illustrated, at N=0 (i.e. with no blending), the blend constituents are substantially discrete with the gradual progression indicated for greater N values through various defined stages with increasing levels of blending. Layered arrangements convert to derivative microstructures as shown in FIGS. 4 and 5 any of which can be controllable retained in the extrudate. Thus, by simply selecting a blending level, virtually any desired blend-dependent result may be achieved.

It is also contemplated that any number of other configurations and arrangements of rod elements may be utilized to achieve desired morphology characteristics. By way of example only, and not limitation, it is contemplated that rod elements may be arranged in substantially side-by-side relation along a straight line. One such arrangement is illustrated in FIGS. 11A-11F. As will be appreciated, in such arrangements, the number of rod elements may be varied as desired. Thus, while a four-rod arrangement is illustrated, it is likewise contemplated that any greater or lesser number of rods may likewise be utilized. It is contemplated that such in-line configurations may be well suited for the production of cast films of large width. Generally, for such films of larger width, cavities can be scaled to a greater width with a larger number of rods.

As with the previously described arrangements, the straight-line arrangement in FIGS. 11A-11F provide progressive morphology changes with progressing levels of blending. Thus, the blend morphology may be controlled in a predefined manner by adjusting the level of blending to which the constituents are subjected in the manner as previously described.

Still another potentially desirable blender configuration that may provide substantial advantages is illustrated in FIGS. 12 and 12A wherein elements corresponding to those previously described are designated by like reference numerals within a 200 series. As will be appreciated, FIG. 12 is a cross-sectional view similar to FIGS. 2 and 9 looking along the axis of rod elements 220 within a blender 212 towards an outlet opening 221. FIG. 12A is a cut-away section view taken generally along line 12A-12A in FIG. 12. In this arrangement, the blending cavity 218 is of a generally tri-lobal cross sectional shape with rod elements 220 disposed at the interior of each of the lobes. Each of the rod elements 220 is preferably configured substantially as described in relation to FIG. 1A and FIG. 8 including a body portion 226 tapering to a reduced diameter distal tip portion 232. As in prior described embodiments, the boundary walls of the cavity 218 preferably taper inwardly towards a discharge opening 221. Due to the tapering cross-sectional reduction in the cavity 218, the boundary walls cross the axis lines of the rod elements 220 at positions outboard of the discharge opening 221. Thus, the distal tip portions 232 of the of the rod element may be inserted into acceptance openings 219 within the cavity walls as previously described.

As with the earlier described configurations, the boundary walls of the cavity 218 are preferably tapered inwardly in concert with the reduction in rod element diameter. Such cooperative reduction promotes a stable increase in speed of the blend composition. Such tapering of the rod elements 220 also aids in fixturing of the distal tips into the cavity wall by permitting the straight line insertion of the rod elements 220 into fixture ports at outboard positions relative to the outlet 221. The increase in velocity of the blend composition as it exits the blending zone within the blender 212 increases the stability of the formed extrudate so as to promote retention of the formed structures. The reducing diameter of the rod elements within the convergent zone of the cavity 218 promotes a hydrodynamically smooth delivery of the melt from the cavity.

As best illustrated in FIG. 12, the boundary walls of the blending cavity 218 preferably have smooth contoured protuberant surfaces 242 projecting inwardly relative to the rod elements 220 so as to further promote smooth and stable hydrodynamic flow and more uniform shear stress levels resulting from rod motions in the melt composition. These conditions promote chaotic advection throughout the cavity and especially within regions that would be more distant from the rod surfaces if the protuberant surfaces were not present. As shown, in the configuration illustrated in FIG. 12, the boundary wall protuberant surfaces have a profile projecting inwardly generally between the axis lines of the rod elements 220. This relative geometry may be maintained substantially along the length of the blending chamber including the convergent cross-sectional area portions adjacent the distal ends of the rod elements 220. As will be appreciated, in such a construction interference between the protuberant portions 242 and the rod elements 220 is avoided due to the complementary reduction in diameter of the rod elements. Moreover since the protuberant portions extend towards positions between the rod elements, the rod element fixture positions may be located in lower profile zones between the protuberant portions thereby substantially avoiding any interference between the rod elements 220 and the protuberant surfaces 242. This promotes smooth flow towards the discharge opening 221. Of course, other multi-lobal constructions incorporating four or more lobes may likewise be utilized if desired and would operate in substantially the same manner.

By way of example only, and not limitation, FIGS. 12B-12F illustrate a representative predictive graphical model for a two constituent blend composition processed by the three rod blender 212 wherein the light zones represent a major constituent and the dark zones represent a minor constituent additive. As illustrated, at N=0 (i.e. with no blending), the blend constituents are substantially discrete with the gradual progression indicated for greater N values through various defined stages with increasing levels of blending. Layered arrangements convert to derivative microstructures as shown in FIGS. 4 and 5. Thus, by simply selecting a blending level, virtually any desired blend-dependent result may be achieved.

It is to be understood that while the present invention has been illustrated and described in relation to potentially preferred embodiments, constructions, and procedures, that such embodiments, constructions, and procedures are illustrative only and that the invention is in no event to be limited thereto. Rather, it is contemplated that modifications and variations embodying the principles of the invention will no doubt occur to those of ordinary skill in the art. It is therefore contemplated and intended that the present invention shall extend to all such modifications and variations as may incorporate the broad aspects of the invention within the true spirit and scope thereof. In particular, it is to be understood that any number of other blender configurations may be utilized.

What is claimed is:

1. A chaotic advection blending system for imparting controlled structure to a multi-component fluid composition that may optionally include solid or other additives, the system comprising: a blender comprising a walled cavity having an outboard boundary wall, the cavity housing a plurality of elongate rod elements extending at least partially along the length of the cavity, and wherein the walled cavity constricts to a reduced cross-sectional area adjacent to an outlet port such that portions of the outboard boundary wall extend inward to positions in crossing relation to the central axis of at least a portion of said rod elements such that said portions of the outboard boundary wall define an alignable support surface for at least a portion of the rod elements at positions outboard of the outlet port.

2. The invention as recited in claim 1, wherein at least a portion of the rod elements comprise a body portion tapered to a distal end portion having a cross-sectional area less than the body portion.

3. The invention as recited in claim 1, wherein the cavity comprises a plurality of inwardly projecting protuberant surfaces of substantially smooth rounded profile projecting towards positions between at least a portion of said rod elements.

4. The invention as recited in claim 1, wherein the cavity has a substantially oval cross-sectional geometry.

5. The invention as recited in claim 4, wherein said cavity houses two elongate rod elements.

6. The invention as recited in claim 5, wherein said cavity comprises a pair of substantially opposing inwardly projecting protuberant surfaces of substantially smooth rounded profile projecting towards positions between said rod elements.

7. The invention as recited in claim 1, wherein the cavity has a substantially annular cross-section bordered by an inboard boundary wall disposed in radially spaced opposing relation to the outboard boundary wall.

8. The invention as recited in claim 7, wherein the elongate rod elements are arranged circumferentially around the inboard boundary wall.

9. The invention as recited in claim 1, wherein the cavity comprises an elongate slot structure housing three or more elongate rod elements arranged in side by side relation.

10. The invention as recited in claim 1, wherein the cavity has a multi-lobal cross-sectional geometry comprising a plurality of lobes extending away from the center of the cavity and wherein a rod element is disposed at least partially within each of said lobes.

11. The invention as recited in claim 10, wherein the cavity has a tri-lobal cross sectional geometry.

12. The invention as recited in claim 11, wherein the cavity comprises an outboard boundary wall having inwardly projecting protuberant surfaces of substantially smooth rounded profile disposed between the lobes and projecting towards positions between said rod elements.

13. The invention as recited in claim 1, wherein the outlet port is positioned such that the major cross-sectional dimension of the outlet port is oriented in transverse angled relation to the major cross-sectional dimension of the cavity.

14. The invention as recited in claim 1, wherein at least a percentage of the elongate rod elements comprise outer surfaces that are at least one of roughened or ridged.

15. A chaotic advection blending system for imparting controlled structure to a multi-component fluid composition that may optionally include solid or other additives, the system comprising: a blender comprising a cavity having an outboard boundary wall, the cavity housing a plurality of elongate rod elements extending at least partially along the length of the cavity, wherein at least a portion of the rod elements comprise a body portion tapered to a distal end portion having a diameter less than the body portion and wherein the walled cavity constricts to a reduced cross-sectional area adjacent an outlet port such that portions of the outboard boundary wall extend inward to positions in opposing relation to at least a portion of the rod elements substantially in line with the central axis of said rod elements such that said portions of the outboard boundary wall define an alignable support surface for at least a portion of the rod elements at positions outboard of the outlet port, wherein said rod elements are operatively connected to motion inducing units adapted to impart at least one of rotational or oscillatory movement to said rod elements and wherein the system further comprises a plurality of material delivery units adapted to feed metered quantities of blend components to the cavity, wherein the motion inducing units and material delivery units are operatively connected to at least one process control unit programmed to operate the motion inducing units and material delivery units with reference to compiled information expressed in terms of compositional makeup and blending degree to yield defined microstructure or physical property characteristics.

16. The invention as recited in claim 15, wherein the process control unit is programmed to yield substantially steady state morphology characteristics to the fluid composition and a resulting extrudate product.

17. The invention as recited in claim 15, wherein the process control unit is programmed to yield morphology characteristics to the fluid composition and a resulting extrudate product that vary in a pre-defined controlled manner.

18. The invention as recited in claim 15, wherein the process control unit is programmed to yield a progressive morphology change within the fluid composition and a resulting extrudate product.

19. The invention as recited in claim 15, wherein the process control unit is programmed to yield a regressive morphology change within the fluid composition and a resulting extrudate product.

20. The invention as recited in claim 15, wherein the process control unit is programmed to yield combinations of progressive and regressive morphology changes in the fluid composition and a resulting extrudate product.

21. The invention as recited in claim 15, wherein said cavity houses two elongate rod elements.

22. The invention as recited in claim 15, wherein the cavity has a substantially annular cross-section bordered by an inboard boundary wall disposed in radially spaced opposing relation to the outboard boundary wall.

23. The invention as recited in claim 22, wherein the elongate rod elements are arranged circumferentially around the inboard boundary wall.

24. The invention as recited in claim 15, wherein the cavity has a tri-lobal cross sectional geometry housing three rod elements.

25. The invention as recited in claim 24, wherein the cavity comprises an outboard boundary wall having inwardly projecting protuberant surfaces of substantially smooth rounded profile disposed between the lobes and projecting towards positions between said rod elements.

26. The invention as recited in claim 15, wherein the outlet port is positioned such that the major cross-sectional dimension of the outlet port is oriented in transverse angled relation to the major cross-sectional dimension of the cavity.

27. The invention as recited in claim 15, wherein at least a percentage of the elongate rod elements comprise outer surfaces that are at least one of roughened or ridged.

28. A chaotic advection blending system for imparting controlled structure to a multi-component fluid composition that may optionally include solid or other additives, the system comprising: a blender comprising a walled cavity having an outboard boundary wall, the cavity housing a plurality of elongate rod elements extending at least partially along the length of the cavity, and wherein the walled cavity constricts to a reduced cross-sectional area adjacent to an outlet port such that portions of the outboard boundary wall extend inward to positions in crossing relation to the central axis of at least a portion of said rod elements such that said portions of the outboard boundary wall define a support surface for at least a portion of the rod elements, wherein at least a percentage of the rod elements comprise a body portion tapered to a distal end portion having a cross-sectional area less than the body portion and wherein said distal end portion is housed in inserted relation within an aligned opening disposed within the boundary wall at a position outboard of the outlet port.

* * * * *